United States Patent
Singh et al.

(10) Patent No.: US 7,813,350 B2
(45) Date of Patent: Oct. 12, 2010

(54) SYSTEM AND METHOD TO PROCESS DATA PACKETS IN A NETWORK USING STATEFUL DECISION TREES

(75) Inventors: Sumeet Singh, Fremont, CA (US);
George Varghese, Sunnyvale, CA (US);
Flavio Giovanni Bonomi, Palo Alto, CA (US); Jonathan J. Chang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 761 days.

(21) Appl. No.: 11/551,932

(22) Filed: Oct. 23, 2006

(65) Prior Publication Data

US 2008/0186974 A1    Aug. 7, 2008

(51) Int. Cl.
  *H04L 12/28* (2006.01)
(52) U.S. Cl. .............................. 370/395.32; 370/395.43
(58) Field of Classification Search ........................ None
  See application file for complete search history.

(56) References Cited

U.S. PATENT DOCUMENTS 5,999,536 A * 12/1999 Kawafuji et al. ............ 370/401
6,347,376 B1 * 2/2002 Attwood et al. ................. 726/1
6,772,223 B1 * 8/2004 Corl et al. .................... 709/238
7,032,031 B2 * 4/2006 Jungck et al. ................ 709/246
7,061,874 B2 * 6/2006 Merugu et al. ............... 370/255
2005/0015681 A1 * 1/2005 Strole .......................... 714/47
2005/0078601 A1 * 4/2005 Moll et al. ................... 370/218
2007/0199054 A1 * 8/2007 Florencio et al. ............... 726/5

\* cited by examiner

*Primary Examiner*—Chirag G Shah
*Assistant Examiner*—Jenkey Van
(74) *Attorney, Agent, or Firm*—Schwegman, Lundberg & Woessner, P.A.

(57) ABSTRACT

A method and device to process a packet received by a network device is described. The method may comprise analyzing the packet to identify at least one set of a plurality of sets, mapping the at least one set to at least one functional unit, and performing functionality associated with the at least one functional unit. Analyzing the packet to identify at least one of a plurality of sets may comprise determining when the packet includes at least one set identifier, and identifying the at least one set based on the at least one set identifier. A set status identifier may be defined for each set, the set status identifier indicating when set identifiers associated with a corresponding set are detected in the packet. The device may be a router, switch or any other device that processes digital data e.g., packet data including packets headers, payload or the like.

23 Claims, 8 Drawing Sheets

| | | | | | |
|---|---|---|---|---|---|
| SET 1 (152.1) | SET 2 (152.2) | • • • | SET n (152.n) | OPTIONAL ADDITIONAL BIT(S) SET (154) | ACTION(S) |
| YES | YES | | NO | (YES) | ACTION ID1 — 156.1 |
| NO | YES | | – | (NO) | ACTION ID2 — 156.2 |
| | | | | | • • • |
| YES | YES | | YES | – | ACTION IDk — 156.k |
| NOT FOUND | NOT FOUND | | NOT FOUND | NO | DEFAULT ACTION(S) — 158 | table 150

*FIG. 6A*

| | | |
|---|---|---|
| (172.1) ACTION ID1 | FU1, FU7, FU50 (174) | SET 3, SET 4 (176) |
| (172.2) ACTION ID2 | | |
| • • • | | |
| (172.k) ACTION IDk | FU7 | – | table 170

*FIG. 6B*

TREE STRUCTURE/ DATA FLOW ANALYSIS

SYSTEM AND METHOD TO PROCESS DATA PACKETS IN A NETWORK USING STATEFUL DECISION TREES

FIELD

The present application is related to the field of processing digital data, for example packets in a communications network. For example, the entire content of a packet (including IP headers, payload etc) may be analyzed and, in response to the analysis, a predetermined action or actions may be performed.

BACKGROUND

The processing or analysis of data packets can yield useful information regarding the source and/or the destination of the data packets; more generally, using all the packet header fields as well as the content of the data packets, appropriate action may be taken, if deemed necessary. In particular, data packet analysis may be used for data packet classification, measurement of variables contained in the data packets so as to extract information from the data packets, and detection of anomalies in the data packets.

A traditional implementation technique for stateful packet processing is to use a flow table in which, for every data packet or group of data packets being transmitted through a communications network, there is a corresponding entry in the flow table. The flow table may include data strings associated with the data packets being transmitted, and thus may be memory inefficient. The use of flow tables may be particularly problematic when a data packet (or a plurality of data packets) needs to be examined to see whether it matches a plurality of disparate conditions. In addition, flow tables may be relatively inflexible, with a user generally not being able to easily modify the rules associated with the flow tables.

BRIEF DESCRIPTION OF DRAWINGS

FIG. 6A shows a set mapping table, in accordance with an example embodiment, to map set identifiers to actions associated therewith;

FIG. 6B shows a functional units mapping table that maps actions to corresponding functional units;

DETAILED DESCRIPTION

Figure 1:
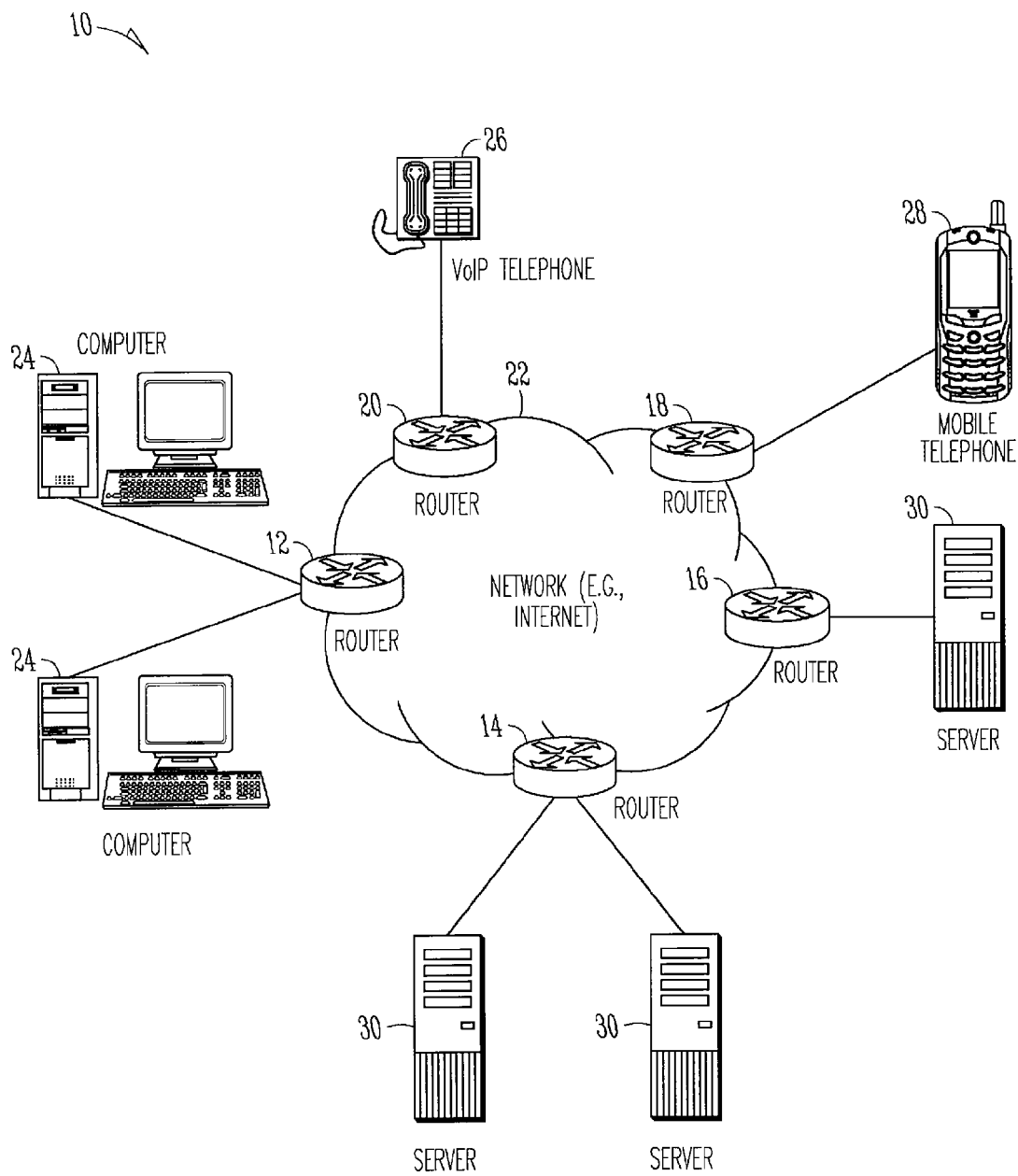
FIG. 1 shows a schematic block diagram of a network, in accordance with an example embodiment.

In the following description, for purposes of explanation, numerous specific details are set forth in order to provide a thorough understanding of an embodiment of the present invention. It will be evident, however, to one skilled in the art that the present invention may be practiced without these specific details.

While conventional packet processing systems allow processing in terms of the current packet headers (e.g., Access Control Lists) and processing using strings contained in the payload of a current packet (e.g., Intrusion Detection systems), example embodiments describes herein allow stateful processing of packets based on the headers and payload sent by similar packets in the past. In the most general case, especially for anomaly detection, packet processing should be stateful and it must thus depend on information gleaned from packets sent in the past. In an example embodiment, a system and method is described to keep a plurality of states associated with packets and payload content sent in the past. In an example embodiment, the method and system may be implemented in real-time and allow efficient processing of packet logs in software.

For example, a first step in detecting attacks against a network may be to determine computers that are "scanning" by sending interrogatory messages to many other computers in a short time to determine potential victims. Once a list of computers performing scanner (scanning nodes) is determined, a more detailed check of the payloads sent by the scanning nodes can be done to determine a signature for the attack being perpetrated. Thus, such an anomaly detection process may have two major steps: first a determination of the scanning computers, and then a content test on only the content sent by the scanning computers. The results of the first step may identify a state which, in this example case, may be a compact representation of a set of IP addresses of the scanning computers. The results of the second step may, for example, only operate if the source address of the current packet belongs to the set of scanning nodes or computers.

Example embodiments described herein may produce an implementation that can achieve high speeds when implemented in hardware or software, and yet be sufficiently flexible so as to allow new stateful detection mechanisms to be programmed in after the fact. Such flexibility may be advantageous in a world where attackers constantly change their tactics in response to new detection mechanisms used by analysts. Thus, example embodiments described herein allow flexible anomaly detection. For example, if attackers begin to use so-called ARP requests instead of TCP packets for scanning in the example above, the example method and embodiments described herein allow reprogramming the first step of the example above without changing the second step.

Another example of stateful processing is the detection and rate control of Peer-to-Peer traffic. Network traffic such that provided by Skype and BitTorrent often disguises itself to enter enterprise networks; an enterprise network that wishes to control such traffic may need to use a multi-stage stateful processing system in order to control such traffic.

In an example embodiment, a model in the form of a stateful decision tree is provided that may be efficiently implemented in hardware or software. In an example embodiment, the decision tree may comprise essentially a tree of tests. The root node (and every other node) may have a test and two edges that lead to two further nodes, one edge for data that passes the test, and one for data that fails the test. In an example embodiment, the decision tree constructs tests based on past packets (and thus on multiple packets as opposed to a single current packet).

Continuing with the example above, the root node may test whether a source IP address sends packets to more than K IP destination addresses to determine if the source is a scanning computer. Source addresses that fail this test, and are thus not scanning computers, are not operated on (e.g., one of the children is empty), but packets with source addresses that pass this test, and are thus scanning computers, are then subject to content processing as described above with reference to the second step. Finally, packets that contain payload that passes one or more tests provided in the second step may then be operated on further (e.g., possibly by dropping the packet, rate limiting such packets, or the like).

Thus example embodiments provide a method and system which includes stateful decision tree functionality. The nodes of a tree may be tests based on header fields or content strings or both. In an example embodiment, method and system are configured to allow reprogramming tests conducted in the decision tree nodes not only to change the test but to change the specified header or content fields being examined at each node of the tree.

Referring to FIG. 1, reference 10 generally indicates a networked system 10, in accordance with an example embodiment, to communicate data between various network devices and network endpoints. In the example system 10, the network devices are shown to be routers 12, 14, 16, 18, and 20. It will be appreciated that any number of routers 12-20 may be provided in the system 10. The routed 12-20 are shown to be connected via a network 22 which may include one or more Local Area Networks (LANs) and/or Wide area Networks (WANs). The system 10 is also shown to include a plurality of endpoints including, for example, a plurality of computers 24 (only two of which are shown in FIG. 1), one or more Voice over IP (VoIP) telephones 26, one or more mobile telephones 28, and a plurality of servers 30 (only three of which are shown in FIG. 1).

In the example system 10, data is communicated via packets or datagrams using any suitable communication protocol (s). For example, packets may be, communicated using the TCP/HTTP protocols. Further, although the system 10 is shown to include routers 12-20, it should be noted that the example embodiments described herein are equally applicable to other network devices such as switches or the like. Broadly, the example embodiments described herein may be deployed in any network device which receives digital data for communication to another network device. Likewise, the example embodiments may be deployed in any endpoint that processes digital data. Thus, it will be appreciated that the example embodiments described herein may also be deployed in a core layer of the network, a distribution layer of the network, and access layer the network, or the like.

In an example packet switched network, packets may be received by a network device and processed or analyzed to identify an associated set. Sets may be used as the "glue" that connects a node in the decision tree and its child node in a user specified decision tree that describes the desired packet processing/analysis. When a packet passes a test corresponding to a node in the decision tree, the test may specify an identifier (e.g., source IP address, destination IP address) and a set into which the corresponding identifier in the packet is placed. The corresponding child node test may, for example, only be enabled if a subsequent packet has its identifier already placed in the corresponding set. Thus the sets may contain the "state" that links the information gleaned from a previous packet to the actions/tests required to be performed on the subsequent packets. In an example embodiment, the networked system 10 may provide a number of sets (each with its corresponding identifier) to the user that can be used to "program" a decision tree model. For flexibility, in an example embodiment each set may have a corresponding mask that allows the selection of any pre-specified packet field as the identifier that may be inserted into the set.

Thereafter, for example, using a set identifier, one or more sets may be mapped to a plurality of actions which, in turn, may then be mapped to one or more functional units. Each functional unit may then perform or execute its predetermined function or process. For example, one functional unit may do measurements and another functional unit may take actions such as rate limiting packet streams. In an example embodiment, the mapping may be provided by one or more mapping tables (e.g., provided in re-programmable memory). Further, it should be noted that, in an example embodiment, the sets may be mapped directly to the functional units.

Figure 2:
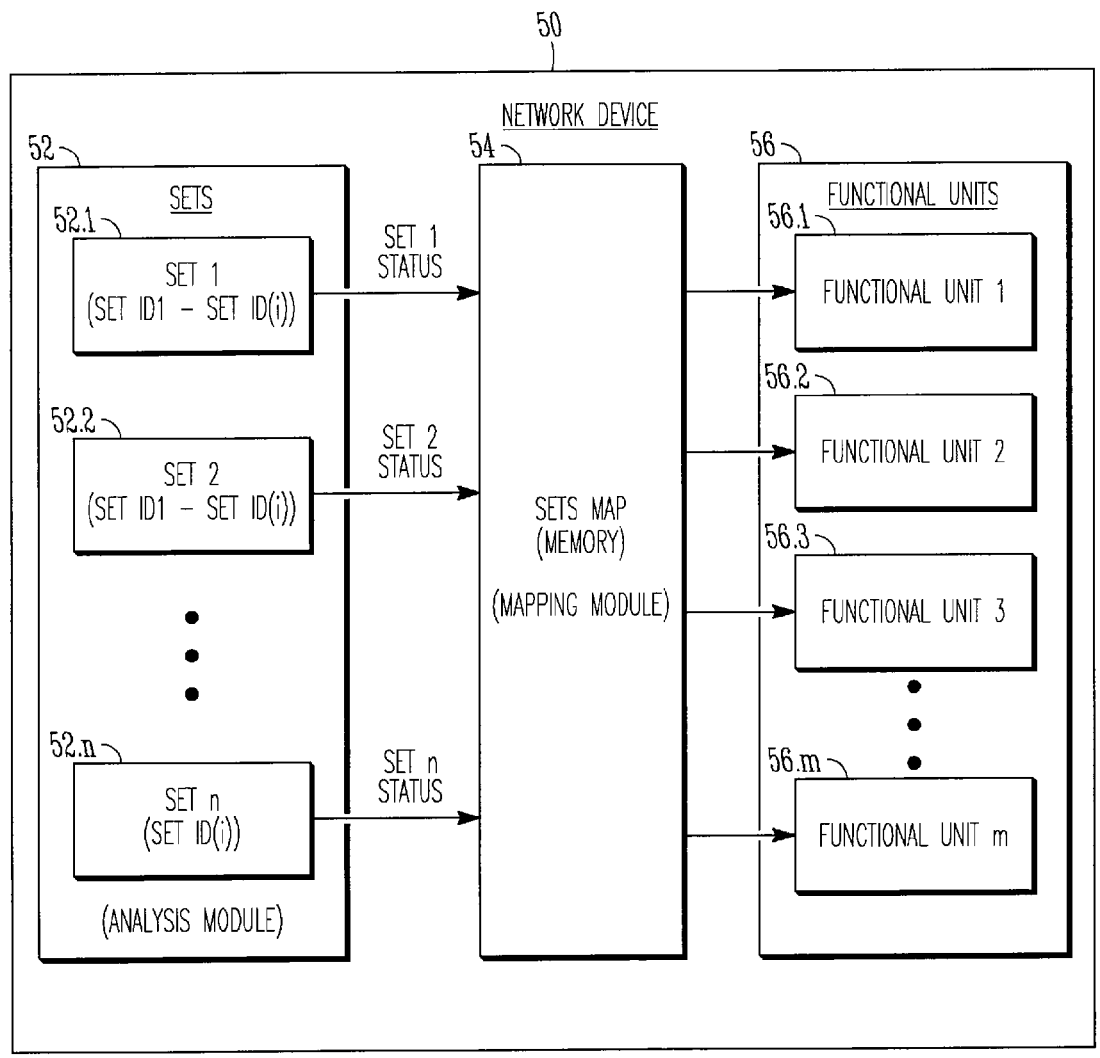
FIG. 2 shows example components of a network device in accordance with an example embodiment.

Referring to FIG. 2, reference 50 generally indicates a network device in accordance with an example embodiment. For the sake of clarity, certain components of the network device 50 have been omitted. The network device 50 is shown to include a sets module 52, a sets map 54, and a functional unit module 56. The sets module 52 is shown to include a plurality of sets of 52.1-52.$n$ which each have one or more set identifiers (Set ID 1-Set ID n). It should be noted that the number of set identifiers (Set ID 1 -Set ID n) associated with each set 52.1-52.$n$ may differ from set to set. For example, one set may have a single set identifier and another set may have 10 set identifiers. Further, two or more different sets 52.1-52.$n$ may share one or more common set identifiers. Thus, and incoming packet may be associated with any one or more sets 52.1-52.$n$. As described in more detail below, each set 52.1-52.$n$ may provide a status indicator (e.g. by setting a bit at 1 or 0) which is used by the sets map 54 to identify one or more functional units of 54.1-54.$m$ (or actions).

In an example embodiment, the set identifiers (Set ID 1-Set ID n) may be encoded identifiers. Further, as described in more detail below, one or more of the functional units 56.1-56.$m$ may perform insert operations on one or more of the sets 52.1-52.$n$. to add new identifiers to one or more of the sets 52.1-52.$n$ and the set 52.1-52.$n$ may thus be dynamic. Further, one or more the functional units 56.1-56.$m$ may perform a query (e.g., lookup) operation to test whether an identifier has been inserted into the set.

Figure 3:
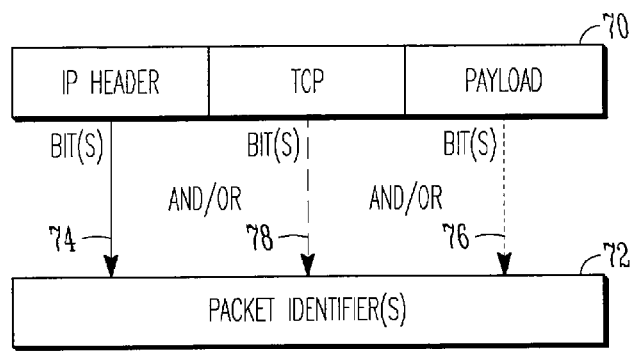
FIG. 3 shows an example packet identifier extracted from any incoming packet.

FIG. 3 shows a packet 70 and a packet identifier 72 which has been derived from the packet 70. It is to be noted that the packet identifier 72 may be generated from any portion of the packet 70. For example, the packet identifier 72 may be extracted from a number of sequential bits in the packet 70, or any other combination of bits or bytes in the packet 70. Further, the packet identifier can be formed by combing one or many bits from different parts of the packet 70. For example, the 32 bits comprising a source IP address could be an identifier (see arrow 74). Another example could be a sequence of bytes in a TCP payload (see arrow 76) combined by the destination port (see arrow 78). A person of skill in the art will appreciate that any combination of any bits in the packet or any data block may be extracted to provide one or more packet identifiers 72.

Figure 4:
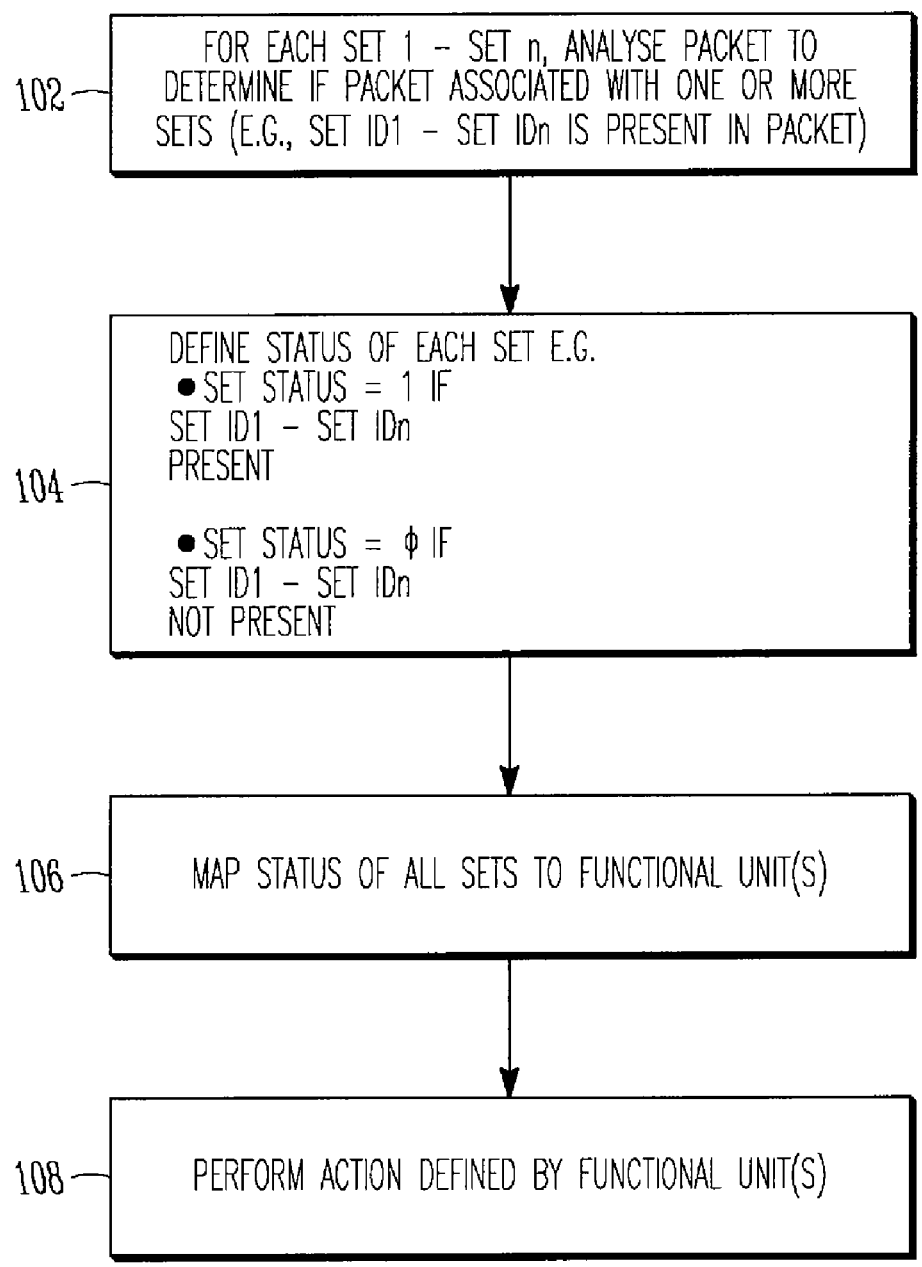
FIG. 4 shows a method, in accordance with an example embodiment, to process and incoming packet.

Referring to FIG. 4, reference 100 generally indicates a method, in accordance with an example embodiment, to process and incoming packet at a network device. The method 100 may be performed by the network device 50 and, accordingly, is described by way of example with reference thereto.

As shown block 102, for each set 1 52.1-52.n. the packet may be analyzed or processed to determine whether or not it includes one or more of the set identifiers (Set ID 1-Set ID n) is present in the packet 70. For example, referring to FIG. 3, the packet identifier 72 extracted from the packet 70 may be compared with a pre-defined set identifier. As described in more detail below, in an example embodiment, a plurality of bit masks may be used to identify the presence of a predefined (programmed or otherwise) set identifier in the incoming packets. Further, it will be appreciated that the methodology described herein may be iteratively or repetitively performed on each packet received by the network device 50.

For example, set 1 may have three corresponding set identifiers namely, Set ID 1, Set ID 2, and Set ID 3. Each of these set identifiers may identifier the presence of a particular bit combination in the packet 70. When all three of these set identifiers are present in the incoming packet, the packet may then, per definition, belong to set 1. Likewise, the sets 52.2-52.n may have various set identifies (which may, or may not, be common to any of the other sets) and, when all identifiers associated with a particular set are detected or identified in the incoming packet 70, the packet may then, per definition, also be associated with one or more of the other sets 52.2-52.n. Thus, and incoming packet may be associated with one or more sets 52.1-52.n. As shown block 104, a set status may be defined which indicates whether or not the particular criteria associated with a set is detected in the packet 70. As described above, the particular criteria may be the presence of the set identifiers (e.g., if the packet contains Set ID 1 AND Set ID 2 AND Set ID 3 it may be associated with set 1). When, for example, it is determined that the incoming packet belongs to a particular set, the status of the set may be set to 1. If, however, the packet 70 does not correspond to the particular set, a status of the set may be set to 0. Thereafter, a shown block 106, the status of all the sets 52.1-52.n may be mapped to associated actions or, directly mapped to one or more functional units. Thereafter, the functional unit executes its associated functionality or task.

Figure 5:
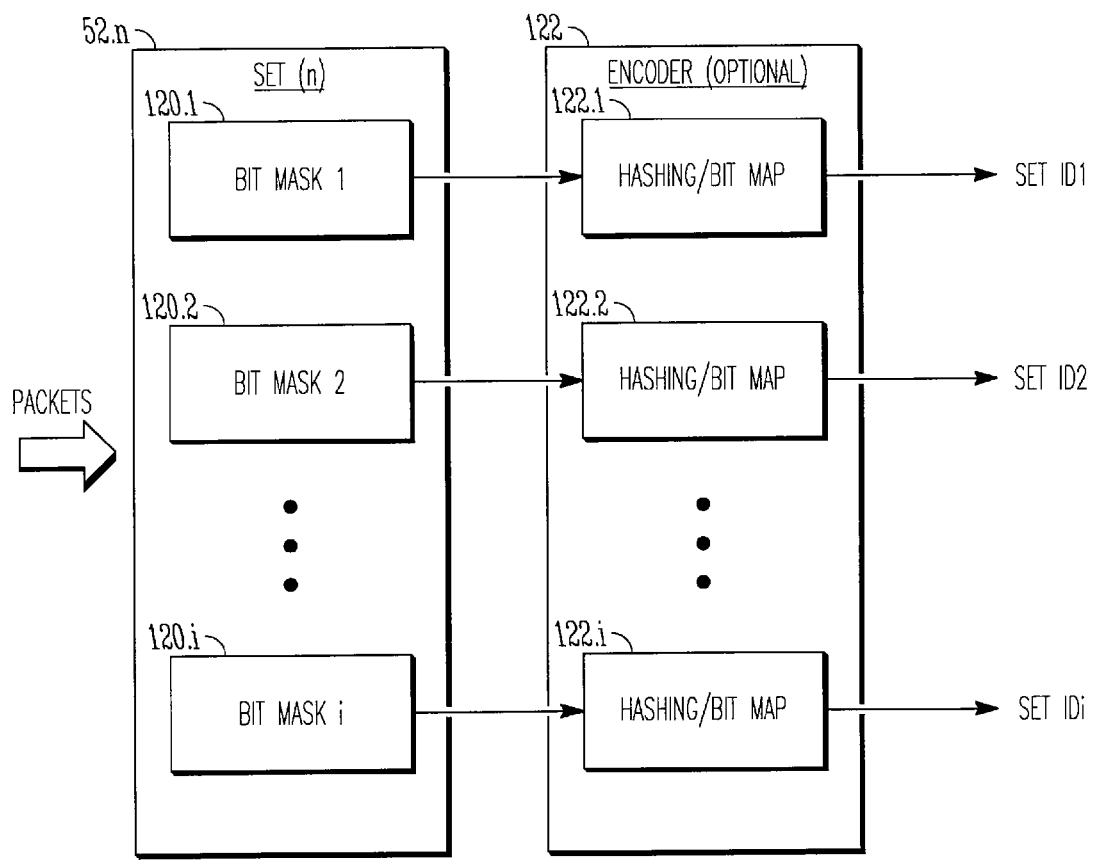
FIG. 5 shows circuitry for implementing sets in accordance with an example embodiment.

FIG. 5 shows an example hardware implementation of a set 52.n. The set 52.n is shown to include a plurality of bit masks 120.1-120.i, each of which correspond to a particular set ID 1-set ID n. As herein before described, the bit masks 120.1-120.i may mask bits of an entire incoming packet 71, or any portion thereof, to identify the presence of a predefined bit combination or sequence in the packet. Thus, incoming packets may be processed to determine whether or not they are associated with the plurality of sets 52.1-52.n. In order to provide a more scalable solution, an optional encoder 122 may be provided to encode output data from the bit masks 120.1-120.i. In an example embodiment, the encoder 122 may comprise a plurality of hashing/map components 122.1-122.i. Outputs from the encoder 122 may provide encoded set identifiers. Thus, in an example embodiment, because each bit mask 120.1-120.i can encode a different type of identifier, bit-masks can be associated with each set that can be applied to the incoming packet to create the identifier. Hashing techniques (hash-map) or bitmap techniques (bloom filters) may be utilized to provide a scaleable implementation of sets in hardware, which may be at the cost of some loss in accuracy.

After the presence of one or more of the set identifiers (Set ID 1-Set ID n) in an incoming packet has been determined, the status of the sets 52.1-52.n may then be determined. Status identifiers may be determined and then mapped to one or more actions as described, by way of example, with reference to a set mapping table 150 shown in FIG. 6A.

The set mapping table 150 is shown to include a plurality of columns and rows wherein the columns identify the status of the sets 52.1-52.n. In particular, a column 152.1 identifies the status of set 52.1, column 152.2 identifies the status of set 152.2 and, generically, column 152.n identifies the status of set n. A further column 154 may optionally identifier the presence of any other one or more bits in the packet 70. Thus, in the example set mapping table 150, when an incoming packet is identified as belonging to, or associated with, a set a corresponding bit in the columns 152.1-152.n and 154 may be set to '1'. The set bit in the set mapping table 150 is represented by way of example as a 'yes' entry. If a particular packet does not belong to a set, a corresponding bit in the columns 152.1-152.n and 154 may be set to '0'. In the table 150 a '0' is shown to be represented as a 'no' entry.

The set mapping table 150 is also shown to include rows 156.1-156.k and 158. Each row 156.1-156.k and 158 may correspond to and associated action. Each action may have an associated action identifier or ID (e.g., action ID 1-action ID k). The action identifier may define any one or more actions that may be required when it is determined that the incoming packet 70 belongs to one or more of the sets 52.1-52.n.

As shown in FIG. 6B, an example functional units mapping table 170 may be provided that maps each action identifier to one or more functional units. For example, action ID 1 provided in row 172.1 is shown to be mapped to the functional unit 1 (FU 1), functional unit 7 (FU 7), and functional unit 50 (FU 50) provided in a column 174. Further, action ID 1 is also shown to be associated with set 3 and set 4 identified at row 172.1 and column 176. For example, when it is determined that the incoming packet 70 corresponds to set 1, set 2, but not to set n (see row 156.1 in FIG. 6A), then the associated functionality to be performed may be executed by functional unit 1, functional unit 7, and functional unit 50 as identified the in column 174 in FIG. 6B. Further, as described in more detail below, a corresponding identifier may be added to set 3 and set 4 as identified in column 176. Thus, using the mapping tables 150 and 170 various actions and functionality performed by functional units may be performed when an incoming packet is identified as belonging to one or more sets.

In an example embodiment the mapping tables 150, 170 may be preprogrammed logic in memory, which maintains a map/translation from the responses given by the sets to one or many functional units. The set mapping table 150 may have had least the same number of columns as there are sets. However, as shown in FIG. 6A, further columns may be provided to implement further functionality. The number of columns 156.1-156.k correspond to the number of different actions that may be required. It will be appreciated that the number of columns and the number of rows may differ from one implementation to another. Each entry in the set mapping table 150 may include either a 'YES' or 'NO' or 'Don't care' condition for each one of the columns as well as one or many actions to be performed if a match is made. In an example embodiment, the YES/NO responses that are returned from the sets 52.1-52.n may be used to index into the set mapping table 150 and thus identify one or more matching rows 156.1-156.k and 158. If a match is found then the mapping-table may respond with a list of corresponding functional units that must process the packet (or perform any other functionality on any other component of the network device). In an example embodiment, if no row is found then (optionally) a default list of function units may be returned. Further, each entry in the set mapping table 150 may also use additional bits from the packet 70 for a finer classification.

Figure 7:
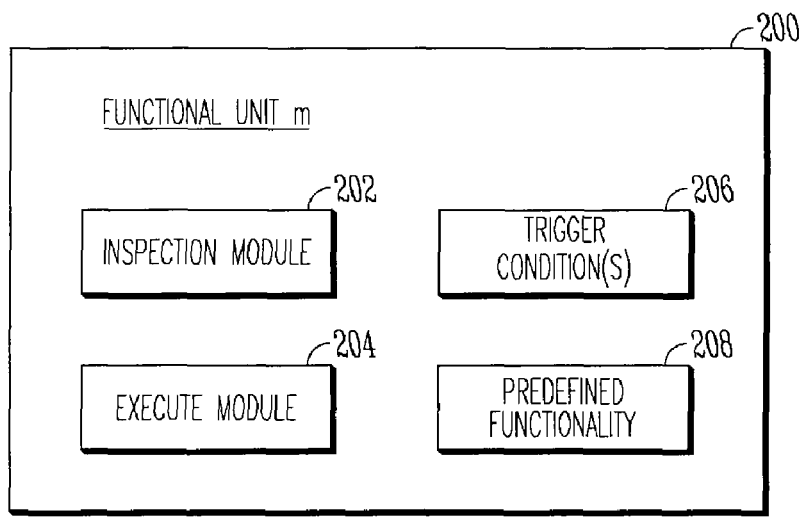
FIG. 7 shows a functional unit module, in accordance with an example embodiment, to execute predetermined functionality.

Example components or modules of a functional unit 200 are shown in FIG. 7. The example functional unit 200 shown to include an inspection module 202, an execute module 204, a trigger condition module 206, and a predefined functionality module 208. As described in more detail below, the inspection module 202 may be configured to inspect the sets to determine identifiers associated with the sets (e.g., to update the sets). The execute module 204 may execute or perform predetermined functionality defined (e.g., programmatically) in the predefined functionality module 208. Example predefined functionality includes inspecting fields in the packet header. For example, identifying if the packet originates from a suspected bad source, identifying what protocol is the packet using, or the like. In addition or instead, the predefined functionality may include inspecting the characteristics of the packet. For example, determining if the packet is fragmented, determining if the length of the packet is above or below some threshold, identifying the presence of some content string or regular expression, or the like. In an example embodiment, the predefined functionality includes performing some action on the packet (e.g., dropping the packet, redirecting the packet, or rewriting the packet).

In an example embodiment one or more functional units 156.m may perform some type of inspection/task on the packet. For example, the functional unit 156.m may process or test of the packet using a predefined algorithm, for example, test to see if a length of the packet is less than 100 bytes. One or more functional units 56.1-56.m also store a trigger condition (see trigger conditions module 206 in FIG. 7) and an associated task/action that may then be performed if the trigger condition is met. It is to be noted that one or more functional units 56.1-56.m may store one or many trigger conditions and the associated tasks that must be performed if the trigger condition is met. For example, the actions may include an action to be taken on a packet if the length of the packet was less than 100 bytes and an action to be taken on the packet if the length is greater than 200 bytes. The function or tasks to be executed by the functional unit m may include, but not be limited to, data packet analysis, data packet classification, measurement of variables contained in the data packets so as to extract information from the data packets, and detection of anomalies in the data packets. It will be appreciated that the functional units 56.1-56.m may perform any appropriate action on a packet or otherwise. For example, a functional unit 56.1-56.n may include, or be defined by, a multistage filter that can be used to count the number of packets sent by a source and trigger on a condition when a source has sent more than a reference number of the packets. Further, for example, a functional units 56.1-56.n may include, or be defined by, a bitmap-counter that can be used to count the number of distinct destinations a particular source has sent packets to and a trigger condition when the number of count exceeds some threshold. Still further, a trigger condition may be associated with a condition that a particular byte sequence or a Regular Expression (RegEx) appears in the packet. In this example case, the functional unit could be a byte sequence or RegEx checker. The actions associated with the trigger may also be a traditional action like, drop the packet, rewrite portions of the packet, create a copy of the packet and so on.

It is important to note that the abovementioned examples do not constitute a limited list of functions that may be performed and, it will be clear to a person of skill in the art that the functional units may be configured to perform any other functionality within, for example, a network device. It should also be noted that that the trigger action associated with a functional unit could be to insert an identifier derived from the current packet associated with a set (as described in more detail but below with reference to FIG. 9) into another set. In an example embodiment, an action associated with a trigger condition may contain the set ID (e.g., set ID1-set ID n) of the set 52.1-set 52.n which the identifier should be associated. It will be appreciated that in an example embodiment, the sets 52.1-52.n may defined groups of identifiers and, when an incoming packet includes all the identifiers in (or associated with) a given set, the packet may then be considered to form part of the set.

Figure 8:
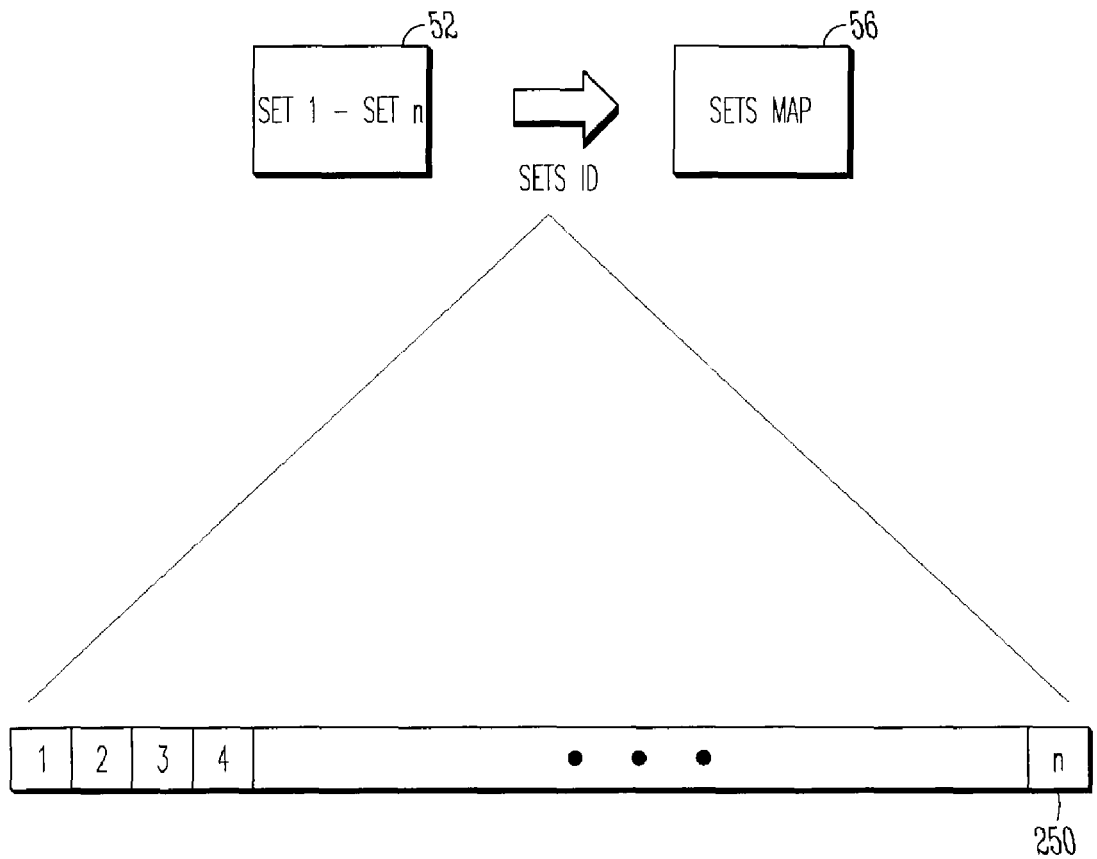
FIG. 8 shows an example mapping in which a unified set identifier maps sets to functional units.

In an example embodiment, a unified sets status identifier may be generated from individual set status identifiers that indicate whether or not the packet forms part of a particular set 52.1-52.n. For example, the status of each set may be defined by a bit set at '1' when the packet forms part of the set, or set it '0' when the packet does not form part of the particular set. FIG. 8 shows an example of a unified sets status identifier 250 which includes n bits wherein each boat of the unified sets step as identifier 250 corresponds to a status of a set. The example, bit 1 may identify the status of set 1, bit 2 may identify the set status of set 2, and so on. The unified sets status identifier 250 may then be used by the set mapping table 150 to identify one or more associated actions. In an example embodiment, the unified sets status identifier may be a bit string (sets status string).

Example processing to generate a unified sets identifier (or key) 250 may be as follows:

```
for each set i (1 ... n)
{
    read the Mask[i] stored with the set
    create the Identifier[i] using the Mask[i]
    Key[i] ← Lookup set[i] using Identifier[i]
}
```

Once the n bit key or unified sets identifier is determined, a lookup in the set mapping table 150 may be performed. As herein described by way of example, a list of functional units and/or a list of set IDs may be derived from one or more mapping tables (e.g., mapping tables 150 and 170). In an example embodiment, each one of the functional units that are listed in the response from the mapping table may process the packet. When the functional unit processes the packet one or many trigger conditions may be met. A list of actions to be taken on the packet may be gathered from the trigger conditions.

In an example embodiment, for each one of the actions in a list, if the action is to insert to (or associate a new identifier with) a set, then the set ID of the set may be read. Once the set ID has been determined, a mask (e.g., one of the bit masks 120.1-120.i associated with the set ID may be read and the bit mask 120.1-120.i is then used to create the identifier. An insert/add operation on the set to insert or associate the identifier with the set. It is to be noted that multiple sets may be updated for the same packet.

Example processing to update a set to include a new set identifier is as follows:

```
for each element 'e' in list of actions,
{
    if action[e] is insert to set operation
    {
    Get set-id from action[e]
    read the Mask[set-id] stored with the set
    Identifier ← create the Identifier using the Mask[set-id]
    Insert Identifier in set[set-id]
    }
}
for each element 'e' in list of actions
```

```
{
    If action[e] is not a set operation
    {
        Perform action[e] on packet
    }
}
```

Figure 9:
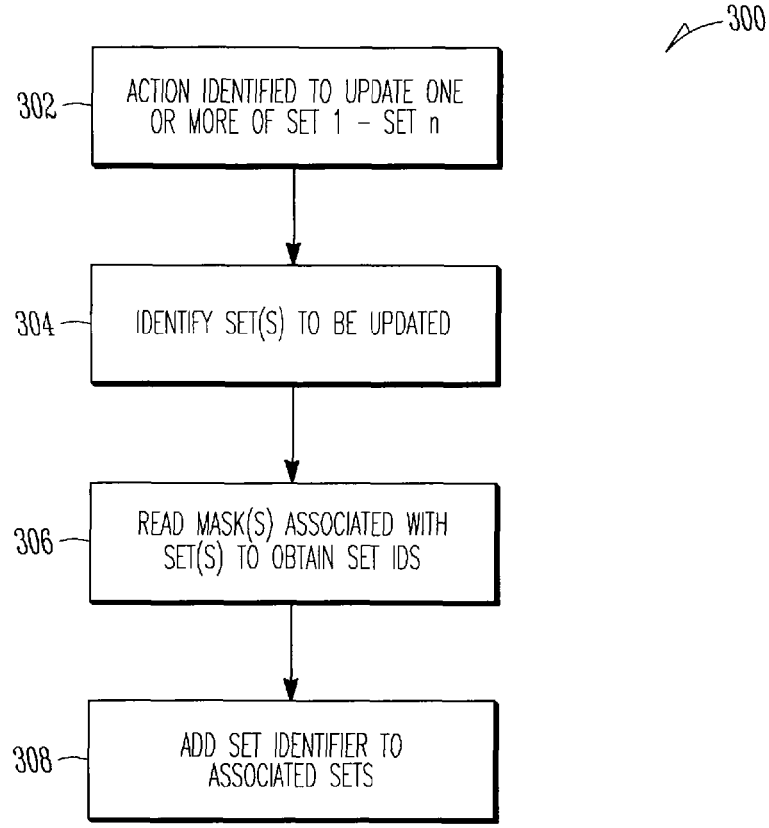
FIG. 9 shows a method, in accordance with an example embodiment, to update sets based on an analysis of and incoming packet.

FIG. 9 shows a method 300, in accordance with an example embodiment, for updating set identifiers in response to analysis on an incoming packet. In an example embodiment, the method 300 is performed by one or more of the functional units 56.1-56.*m*. In blocked 302, the method 300 identifiers and action to update one or more of the sets 52.1-52.*n*. Thereafter, as shown it blocked 304, the one or more sets to be updated is identified by, for example, using masks which may be implemented by Bloom filters. If, for example, the sets are defined by masks (e.g., bit mask 1-bit mask i—see in FIG. 5) the method 300 may then, as shown it blocked 306, read an associated mask to obtain the set identifier. If the set includes a plurality of set identifiers, then the method 300 may read each mask associated with a set identifier. Once the set identifier has been obtained, it may then be added or associated with the set to be updated. For example, a further bit mask in a network device may be configured (e.g., using a software routine).

Figure 10:
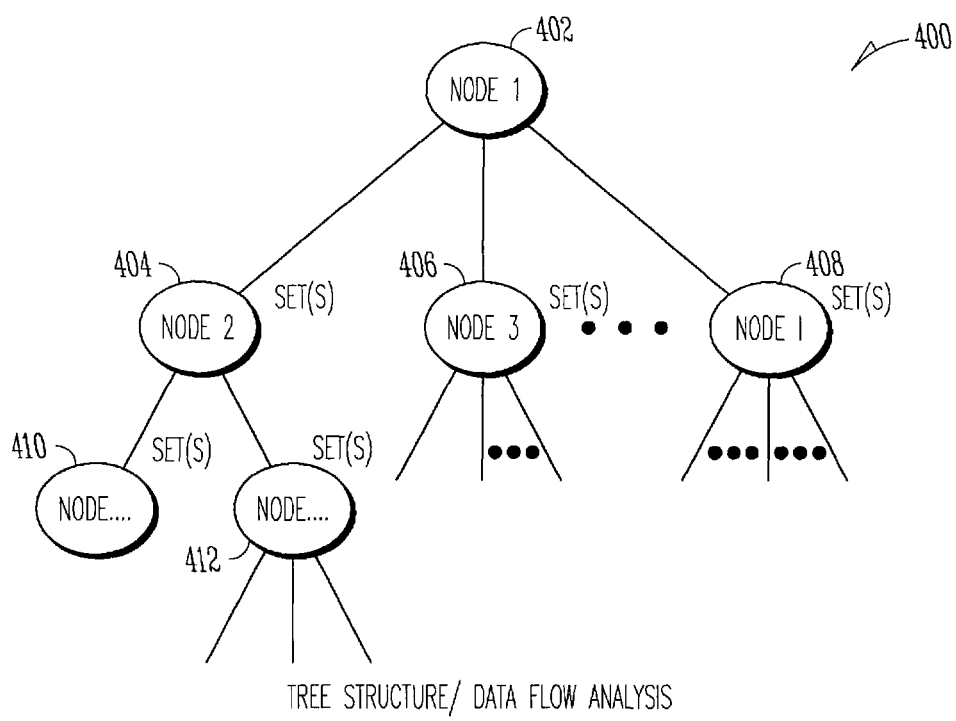
FIG. 10 shows an example mapping of a tree structure or data flow analysis to a plurality of sets, in accordance with an example embodiment.

FIG. 10 shows a mapping 400 of a tree structure/data flow analysis to a plurality of sets as herein before described. The tree structure for/data flow analysis is shown to include a plurality of nodes 402-412 wherein each node is mapped to a set 52.1-52.*m*. In an example embodiment, the sets 52.1-52.*n* are programmable so that one or more set identifiers may form part of, or be associated with, one or more of the sets. Accordingly, tasks/actions to be performed at each node 402-412 may be dynamically variable. Further, the branching or actual flow of any decision tree may be dynamically variable or dynamically updated. Using this technique, sets can be used to establish what state a particular flow belongs to and can thus assist in eliminating the need for maintaining a precise per-flow state. The sets act may thus as inverted per-flow tables.

In a decision tree, one or more tests may be conducted at every step and the results of the tests determine the next step. The decision tree may be viewed as a graph with nodes/vertices and edges, each node representing the current stage (the current stage identifying one or more tests to be conducted) and each edge may represent a trigger condition. Each node may have many edges, and multiple trigger conditions may map to the same edge. Each node may also perform default functionality that may be taken if no trigger condition is met. A default edge of the node may point to itself. It is to be noted that a decision graph may not be restricted to a tree (where every node other than the root has a unique parent but can also be an acyclic decision graph (where every node could have multiple parents) and a child node test is enabled if the corresponding identifiers are either in all of the sets or in one of the sets.

Figure 11:
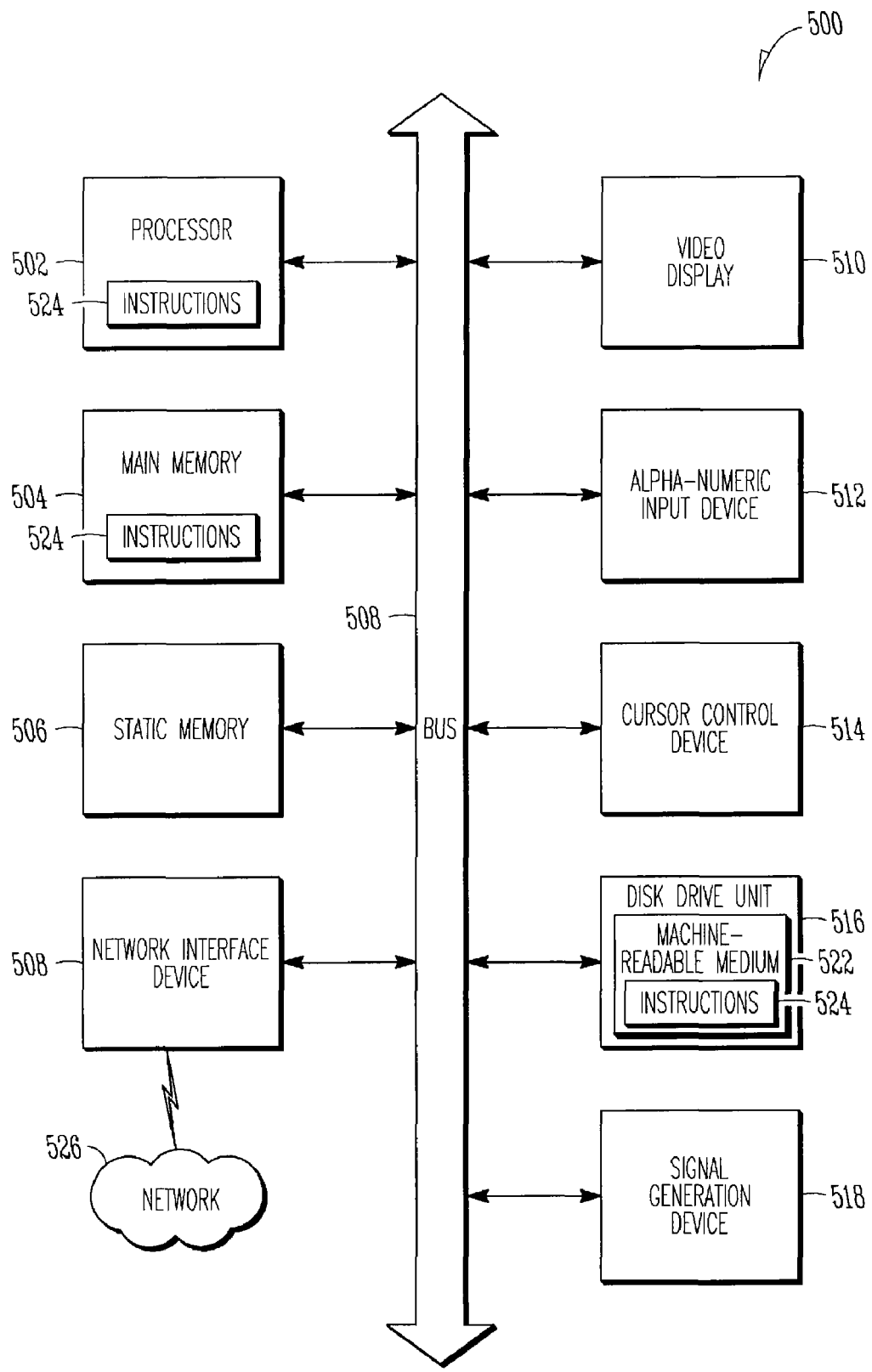
FIG. 11 shows a diagrammatic representation of machine in the example form of a computer system within which a set of instructions, for causing the machine to perform any one or more of the methodologies discussed herein, may be executed.

FIG. 11 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present application, or that is capable of storing, encoding or carrying data structures utilized by or associated with such a set of instructions. The term "machine-readable medium" shall accordingly be taken to include, but not be limited to, solid state memories, optical and magnetic media.

Although the present application has been described with reference to specific example embodiments, it will be evident that various modifications and changes may be made to these embodiments without departing from the broader spirit and scope of the application. Accordingly, the specification and drawings are to be regarded in an illustrative rather than a restrictive sense.

The invention claimed is:

1. A method for processing a packet received by a network device, the method comprising:
    using at least one processor, automatically analyzing the packet to identify when the packet is associated with at least one set of a plurality of sets, the analyzing comprising:
        determining when the packet includes a plurality of set identifiers;

identifying a plurality of corresponding sets each associated with at least one of the plurality of set identifiers; and defining a set status identifier for each set, each set status identifier indicating if the packet is associated with the corresponding set based on at least one of the plurality of set identifiers, using at least one processor, automatically accessing a mapping table using the set status identifiers of the plurality of sets, to identify at least one functional unit; and performing functionality associated with the at least one functional unit, the functionality comprising associating at least one set identifier with at least one other set of the plurality of sets, the associating comprising:

identifying the at least one other set for updating, the at least one other set for updating being identified by the functional unit;

reading a mask associated with a set used to identify the functional unit; and adding the set identifier to the at least one other set.

2. The method of claim 1, in which the analyzing comprises, for at least one of the sets:

extracting a packet identifier from the packet using a mask corresponding to the at least one set;

determining if the extracted packet identifier corresponds to a set identifier of the at least one set; and associating the packet with the at least one set when the extracted packet identifier corresponds to the set identifier.

3. The method of claim 2, which includes using a Bloom filter to define the mask corresponding to each set.

4. The method of claim 2, which includes using a Bloom filter to define a mask that corresponds to a plurality of sets.

5. The method of claim 1, which comprises:

combining the set status identifiers of the plurality of sets into a sets status string; and accessing the mapping table using the sets status string to identify the at least one functional unit.

6. The method of claim 1, which comprises encoding masked bits to provide an encoded identifier.

7. The method of claim 1, which comprises:

mapping nodes of a decision tree, acyclic decision graph or a data flow analysis (DFA) to the plurality of sets; and associating a functional unit to provide functionality required at each node.

8. The method of claim 1, which comprises performing the functionality associated with the at least one functional unit multiple times.

9. The method of claim 1, which comprises mapping a plurality of different functional units to the same set.

10. The method of claim 1, in which analyzing the packet to identify the at least one set comprises masking bits in a packet to provide a set identifier.

11. A network device to process a received packet, the device comprising:

an analysis module, using at least one processor, to analyze the packet to identify when the packet is associated with at least one set of a plurality of sets, the analysis comprising:

determining if the packet includes a plurality of set identifiers;

identifying a plurality of corresponding sets each associated with at least one of the plurality of set identifiers; and defining a set status identifier for each set, each set status identifier indicating when the packet is associated with the corresponding set based on at least one of the plurality of set identifiers, a mapping module to access a mapping table using the set status identifiers of the plurality of sets, to identify at least one functional unit; and a plurality of functional units including the at least one functional unit to perform predefined functionality, the functionality comprising associating at least one set identifier with at least one other set of the plurality of sets, the associating comprising:

identifying the at least one other set for updating, the at least one other set for updating being identified by the functional unit;

reading a mask associated with a set used to identify the at least one functional unit;

and adding the set identifier to the at least one other set.

12. The network device of claim 11, in which the analysis module is configured such that the analyses comprises, for at least one of the sets:

extracting a packet identifier from the packet using a mask corresponding to the at least one set;

determining if the extracted packet identifier corresponds to a set identifier of the at least one set; and associating the packet with the at least one set when the extracted identifier corresponds to the set identifier.

13. The network device of claim 12, wherein the mask is a Bloom filter.

14. The network device of claim 13, wherein the Bloom filter corresponds to a plurality of sets.

15. The network device of claim 11, in which the set status identifiers of the plurality of sets are combined into a sets status string, and the mapping table is accessible using the sets status string to identify the at least one functional unit.

16. The network device of claim 11, in which masked bits are encoded to provide an encoded identifier.

17. The network device of claim 11, in which the mapping module is configured to:

map nodes of a decision tree, acyclic decision graph or a data flow analysis (DFA) to the plurality of sets; and associate a functional unit with functionality required at each node.

18. The network device of claim 11, in which the functionality associated with the functional unit is performed multiple times.

19. The network device of claim 11, in which the mapping module is configured to map a plurality of different functional units to the same set.

20. The network device of claim 11, in which analysis module is configured to identify at least one set of a plurality of sets and mask bits in a packet to provide a set identifier.

21. The network device of claim 11, which is one of a router and a switch.

22. A non-transitory machine-readable medium embodying instructions which, when executed by a machine, cause the machine to:

analyze a packet to identify when the packet is associated with at least one set of a plurality of sets, the analysis comprising:

determining when the packet includes a plurality of set identifiers;

identifying a plurality of corresponding sets each associated with at least one of the plurality of set identifiers; and defining a set status identifier for each set, each set status identifier indicating if the packet is associated with the corresponding set based on at least one of the plurality of set identifiers, access a mapping table using the set status identifiers of the plurality of sets, to identify at least one functional unit; and perform functionality associated with the at least one functional unit, the functionality comprising associating at least one set identifier with at least one other set of the plurality of sets, the associating comprising:

identifying the at least one other set for updating, the at least one other set for updating being identified by the functional unit;

reading a mask associated with a set used to identify the functional unit; and adding the set identifier to the at least one other set.

23. A network device to process a packet, the device comprising:

means for analyzing the packet to identify when the packet is associated with at least one set of a plurality of sets, the analysis comprising:

determining when the packet includes a plurality of set identifiers;

identifying a plurality of corresponding sets each associated with at least one of the plurality of set identifiers; and defining a set status identifier for each set, each set status identifier indicating if the packet is associated with the corresponding set based on at least one of the plurality of set identifiers, means for accessing a mapping table using the set status identifiers of the plurality of sets, to identify at least one functional unit; and means for performing functionality associated with the at least one functional unit, the functionality comprising associating at least one set identifier with at least one other set of the plurality of sets, the associating comprising:

identifying the at least one other set for updating, the at least one other set for updating being identified by the functional unit;

reading a mask associated with a set used to identify the functional unit; and adding the set identifier to the at least one other set.

* * * * *